US012746761B2

(12) United States Patent
Alcantara

(10) Patent No.: US 12,746,761 B2
(45) Date of Patent: Sep. 29, 2026

(54) METHOD AND DEVICE FOR SYNCHRONIZING A PROCESS FOR PRINTING ON CARDBOARD

(71) Applicant: Kento Digital Printing S.L.U., Castellon (ES)

(72) Inventor: Pedro Benito Alcantara, Castellon (ES)

(73) Assignee: Kento Digital Printing S.L.U., Castellon (ES)

(*) Notice: Subject to any disclaimer, the term of this patent is extended or adjusted under 35 U.S.C. 154(b) by 390 days.

(21) Appl. No.: 18/695,798

(22) PCT Filed: Jun. 21, 2022

(86) PCT No.: PCT/ES2022/070393
§ 371 (c)(1),
(2) Date: Mar. 26, 2024

(87) PCT Pub. No.: WO2022/269117
PCT Pub. Date: Dec. 29, 2022

(65) Prior Publication Data
US 2024/0391250 A1 Nov. 28, 2024

(30) Foreign Application Priority Data
Jun. 23, 2021 (ES) ................................ ES202130595

(51) Int. Cl.
*B41J 2/525* (2006.01)
*B41J 3/54* (2006.01)
*B41J 29/393* (2006.01)

(52) U.S. Cl.
CPC ................. *B41J 2/525* (2013.01); *B41J 3/54* (2013.01); *B41J 29/393* (2013.01)

(58) Field of Classification Search
None
See application file for complete search history.

(56) References Cited

U.S. PATENT DOCUMENTS

| | | | | |
|---|---|---|---|---|
| 2008/0063980 A1* | 3/2008 | Lungu | G03F 7/2004 430/300 |
| 2009/0123206 A1 | 5/2009 | Schnabel et al. | |
| 2018/0264851 A1* | 9/2018 | De Roeck | B41J 3/4078 |

FOREIGN PATENT DOCUMENTS

| | | |
|---|---|---|
| DE | 4218764 A1 | 12/1993 |
| JP | 2008260193 A | 10/2008 |
| JP | 2019142232 A | 8/2019 |

OTHER PUBLICATIONS

International Search Report filed in PCT/ES2022/070393, dated Jan. 8, 2022; 6 pages.

* cited by examiner

*Primary Examiner* — Darryl V Dottin
(74) *Attorney, Agent, or Firm* — Vedder Price P.C.

(57) ABSTRACT

The invention as its name indicates relates to a method and device that comprises the adjustment and synchronization of a flexographic printing process and a digital printing process, both in a hybrid printer suitable for printing on a cardboard plate, in such a way that the prints of the largest colored spots, such as backgrounds or abundant colors, and the superimposed colors or watermarks overlap with high precision according to a pre-set design and are adjusted.

11 Claims, 1 Drawing Sheet

METHOD AND DEVICE FOR SYNCHRONIZING A PROCESS FOR PRINTING ON CARDBOARD

The invention as its name indicates refers to a method and device that comprises the adequate adjustment and synchronization of a flexographic printing process and a digital printing process, both within a hybrid printer suitable for printing on a cardboard plate in such a way that larger color areas, such as backgrounds, overlap with superimposed colors or watermarks with high precision, according to the pre-set design.

The synchronization of the two types of printing on the plate is efficient in terms of consumable expenditure and provides excellent image quality since the positioning of the prints is carried out with a minimum margin of error.

The technical field to which the invention belongs is that of printing.

BACKGROUND OF THE INVENTION

Some types of printer usually have sensorics or artificial vision equipment to analyze the prints once made in such a way that they can correct variations or inaccuracies based on that first print and gradually correct them in subsequent ones.

Other printing types have systems that recognize sheets by means of a sensor that detects the proximity of the edge of the sheet to be printed. This signal is used to determine the start of the digital printing.

Patent DE102009035006 relates to a device and method for evaluating control marks on printing materials that detects whether a certain intensity threshold is exceeded. It is based on a computer that processes the image captured from the control marks after printing.

DE4218764A1 relates to a method for placing a registration mark sensor in a sheet-fed printing machine. Said invention has a series of devices intended to register mark tracks for line registration control after printing.

Patent WO2018061625 consists of a printed object management apparatus which has a printing quality inspection unit for inspecting the quality of the overall pattern of a printed object, based on the data input of an online sensor and a printing density control unit for controlling the amount of ink supplied so that the amount of ink is equal to the reference density.

In this type of systems, the print quality is inspected and, after printing, said registration is carried out on the control tables after printing (outside the machine) or on the same machine but after printing, where it is considered that the possible registration error is always repetitive on all the plates and the desired print is reached by adjusting small movements.

Patent CN102582243 discloses a method of registering embossing, intaglio printing, rotary screen printing and stamping of full servo rear labels.

In this patent, a form of printing is used in the lower part of the material and serves to move an analogue printing by adjusting the motor that advances and/or delays the printing, where the synchronization effect would not be operative since the printing is carried out in the lower part.

Most current machines perform a quality analysis after digital printing or are based on totally offline systems where a sample is collected and located under the optical system for centering the printing with respect to axes, in which the alignment data is finally collected and errors are corrected.

By not registering a mark before the digital printing process, it is necessary to carry out the revision after printing, which has an impact on the quality and efficiency of the machine where precision errors must be constantly corrected by collecting alignment data to correct said adjustment as the printing process is generated.

Another limitation of current systems is that, when correcting a posteriori, the plates already printed with the error will be discarded, with the resulting expense in plates, inks and other consumables. The analysis allows to readjust the erroneous values before printing each and every one of the plates and to avoid an invalid printing.

DESCRIPTION OF THE INVENTION

To solve this problem, the invention consists of a device and method for synchronizing flexographic printing and digital printing where an adequate precision in the adjustment of the prints has to be achieved. For this purpose, a registration mark is used, printed on the cardboard plates, this mark being pre-established before the start of flexographic printing.

The precision required depends on the use to which the printed material is put since, for example, a label on a water bottle needs a different degree of precision than an advertising poster on a road where such precision is not necessary.

For the type of print of interest, we will understand by adequate precision in the adjustment a value close to 1 pixel, that is, between 0.1 and 2 pixels, which means a difference between the start of both prints less than 0.2 mm for an adequate synchronization between flexographic printing and digital printing. The images for which correct printing is sought are those that are printed on medium to small corrugated cardboard, of the type that usually contain relatively small text or barcodes. Therefore, an accuracy below 0.3 mm is tolerable. However, if it improves to 0.1 mm (such that the eye cannot perceive it) it will be better.

The registration mark is recognizable by the sensorics which govern digital printing, allowing to establish a recognition pattern of the registration mark on the plates prior to digital printing to enable its start or, otherwise, to stop the printing due to the absence or lack of adequate recognition of the registration mark.

At the same time, the system collects data on the speed of the cardboard plates, the distance or frequency between them as they pass through the printing line, and the distance from several recognition points along the printing line that detect the passage of the cardboard plates in motion towards the sensor area where the registration marks printed on them will be recognized.

Flexographic printing is used as a reference for the adjustment of the plates that are first printed flexographically and then digitally.

To this end, at least one registration mark recognizable by a reading device linked to the digital printing device is included in the design for flexographic printing. Preferably, this registration mark, of a small size, is in the most forward area in the printing direction of the cardboard plate to be printed.

In a possible embodiment, the registration mark may be the same drawing to be printed by the flexographic printer or a part thereof; for example, the part closest to the front position in the advancement direction, where the location and dimensions of said mark are established as parameters within the system so that they are recognized by the sensorics when enabling the digital printing process.

In another possible execution, another additional registration mark could be added to identify not only the initial position of the digital print on the flexographic print reference, but also the angle of arrival required for digital printing to be enabled.

Preferably, these registration marks are printed in the cardboard reserve area, which is a small area around the entire perimeter of the cardboard that is used after printing to make the cut and indentation that transform the cardboard into a box, although they can be printed at other points.

The roller or cutting plate is mechanically supported on this reserve area to achieve the finished product, resulting in all the boxes having the same dimensions. Therefore, the reserve area is a waste that already exists, and it is used to insert the registration mark in order not to generate more waste.

In a preferred embodiment, the dimensions of the registration mark are established with a variable width between 5 mm-15 mm and a length between 0.1 mm to 10 mm, which provides the appropriate size depending on the thickness of the light spot generated by the sensorics of the system since, if the mark has a smaller size, the sensors will not be able to detect the color, which could cause erroneous readings since it would be partially detecting the printed mark and the cardboard. On the other hand, a larger mark can affect the original design or generate excessive cardboard waste.

Prior to the start of the serial printing process, a calibration process of the system is carried out where the new color that will be printed by the previous station is identified, in this case flexographic printing, which allows to establish a recognition pattern for each series of printing defined by the color and/or contrast that is generated on the plate and the registration mark, where the first printed plates, which will hereinafter be defined as sample plates, will be used so that, by means of the sensorics, the system is able to determine the new pattern defined by the color of the plate to be printed and the color of the ink in flexography.

For the proper recognition pattern, it is necessary to read the colors detected in the passage of the cardboard plates through this area; the color of the background of the printing line, the color of the cardboard plate and the color of the registration mark in a certain time range.

This time range, which we will call the time window, will be a space of time in which a series of events occur and are detected which are detected and collected in the form of signals that are preferably determined by the sequence of colors read by the sensor, where the correct pattern corresponds to the signals that will govern the printing process.

In a preferred embodiment, the time window has a range from 20 to 100 milliseconds before and after the recognition point which is when the cardboard plate must reach the sensory zone according to the data collected by the system.

The detection of the registration mark is conditioned by the type of material on which it is printed and the colors of ink printed. For this reason, the detection system of said mark first detects the color of the material on which it is printed and then detects the color previously printed in the flexographic printing process in such a way that when the system detects said combination of colors it identifies the registration mark that the digital printing process will use as a reference.

The recognition of the registration mark provides the system with the location of the registration mark on the plate, helps to verify that the spacing between marks and between plates is correct and allows to establish the precise setting to start the serial printing.

The calibration process comprises;

1 Preparation of the flexographic cliché with the registration mark(s), wherein said registration marks or mark may be part of the drawing to be printed.
2. Establishment of system parameters, where:
   a. A program is generated that automatically detects at least one registration mark by generating the new reference pattern in such a way that:
      i. The first sample plate advances along the printing line coming from flexographic printing towards an area where one or more sensors are located, which we will hereinafter call the sensor area, which record the required values.
      ii. The operator can validate the adjustment on the screen by accepting the detected color or contrast pattern.
3. Generation of a suitable time window to filter possible detection failures or false alarms generated by the sensorics during the printing process where:
   a. With all the data collected by the system, the frequency with which the cardboard plates reach the sensor area is calculated and therefore the registration mark(s) are detected.
   b. With the time window open, signals will be recognized as good, allowing a single detection in this window. On the contrary, the rest of the time the window is considered CLOSED and possible false alarms or patterns detected out of time must be ignored.
4. Verification of the time window; A second printed sample plate is used to verify that the time window is correctly established, confirming the detection of the pattern. Once the system is calibrated, each time the sequence "cardboard color-registration mark color" is detected in the sensor area, it will recognize the specified pattern and generate a warning signal for the system to perform the calculation of the time in which it will start printing in digital.

The opening of a time window enables the system to accept a signal (cardboard approach signal) allowing to establish the actuation times on the printing process. Once the time window closes, if the sensor generates new signals, these will be ignored by the system.

In a possible embodiment, the cardboard color in the aforementioned sequence "cardboard color-registration mark color" can also be defined by the contrast of luminosity that can be perceived by the sensor on the cardboard plate.

In another possible embodiment, the calibration can be carried out manually where it must be calculated that the plate stops exactly in the sensory area so that the reading of the registration mark is carried out, where to calculate this the distance or the time that elapses from the feeding of plates or from other plate detection points will be indicated.

In a preferred embodiment, the system establishes the location of a single registration mark by means of the sensor readings with two light beams located in a line parallel to the advancement direction of the cardboard plates so that, as the cardboard advances along the printing line from the flexographic printing, a series of colors or contrasts with illumination associated with the printing line itself, the cardboard plate, and the registration mark will be recognized and captured, where for example, the colors to be detected are that the color of the printing line is black, that the color of the cardboard is white and the color of the registration mark is black (although any different combination could occur) with the following combination and sequence:

Pattern 1=printing line—printing line: Black-black
Pattern 2=printing line—cardboard: black-white Pattern 3=cardboard—cardboard: white-white Pattern 4=cardboard—registration mark: white-black Pattern 5=registration mark—registration mark: black-black Pattern 6=registration mark—cardboard: black-white Each pattern is defined by the reading of the first beam of light or that closest to the digital printer and by the second one that is in line, parallel to the transport movement and therefore farthest from the digital printer.

Where pattern 4 or 6 is used as a reference since it indicates that one of the light beams recognizes the cardboard plate and the other light beam recognizes the registration mark.

In a possible embodiment, the recognition of the location of the registration mark is carried out by means of a light beam projected on the printing line, where as the cardboard advances the sensor reads the different colors according to their order of arrival, with a certain sequence establishing a series of combinations.

The definition of the parameters and the calibration of the system allow to start the serial printing process by properly synchronizing the flexographic and digital printing process.

Flexographic printing is executed starting from the design in which a registration mark is preferably included in addition to the background color. Once the cardboard plates complete the flexographic printing, they advance on the printing line where an adequate coordination is established between the output speed of the plates from the flexographic printing, which will be a high speed, and the speed required to pass through the sensory and input area in the digital printing, which will be lower.

Once the cardboard plates are passing through the sensory area, the registration mark that enables the continuation of digital printing is recognized where the previously established pattern is confirmed. In the event that said passage of the registration mark by the sensor cannot be confirmed, an alarm signal is generated that stops the printing process. The generation of alarm signals can occur for example due to the absence of cardboard plates to be printed, slowing down the printing process; this can occur when within the enabled time window a registration mark is not detected or no signal arrives, and the printing will stop due to the absence of signals, which is equivalent to the absence of plates to be printed.

Faults can also occur in the printing process that lead the system to generate false signals. One of the sensors can detect a similar color pattern but not corresponding to the registration mark; in situations of this type the system resorts to the time window system, but at this point, it will look at the time in which new signals are not accepted by filtering them in such a way that they are ignored.

Once both the registration marks and the correct color pattern are properly detected, the digital printing process is enabled, which calculates the start time based on the data collected and constantly generated by the system, maintaining the precision in the desired fit between the flexographic and digital prints in the hybrid printing system.

The device that allows the above method to be applied comprises:

a flexographic printing station;

a transition table;

sensorics;

a transport table;

a digital printing station.

Wherein, in the flexographic printing station, the registration mark is printed on the cardboard plate.

Following the course of printing, after the flexographic printing station, the transition table (not shown) is arranged that receives the cardboard plates already flexographically printed with the registration mark.

This transition table receives the plates at a speed determined by the output speed of the flexographic printing; the speed of the plates must be adjusted to that required for digital printing.

The transition table, in addition to adjusting the speed of the cardboard plates to that required for digital printing, drives such plates towards the sensorics and towards digital printing.

The sensorics, which governs digital printing, is arranged at a point prior to digital printing and comprises sensors suitable for color discrimination even in low light conditions.

The sensorics identifies a registration mark on the plate and verifies that the pattern is met.

If the sensorics verifies that the pattern is met, the cardboard plate continues its journey entering the digital printer where the digital print is produced.

DESCRIPTION OF AN EMBODIMENT

Figure 1:
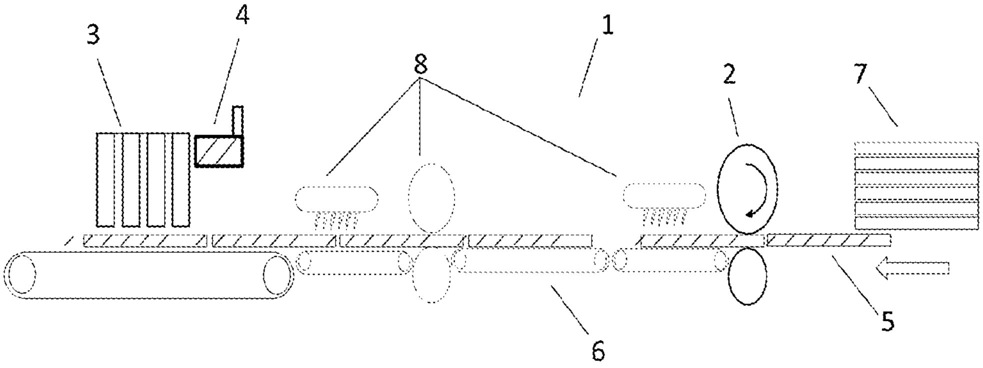
FIG. 1. A side view of the device for the application of the synchronization process (1) between the printing of a flexographic printing station (2) and printing on a digital printing device (3), where the direction of advance of the cardboard plates (5) is shown by the printing line (6) arriving from the cardboard plate (5) feeder (7), passing first through the flexographic printing process (2) and then moving towards the sensorics (4) (always prior to the digital printing process) that performs the readings and collects the data that enable the start of printing of each color in the digital printing process (3). Other elements (8) are also observed, such as drying stations, varnish applicators, among other elements that prepare the material for subsequent digital printing.
Figure 2:
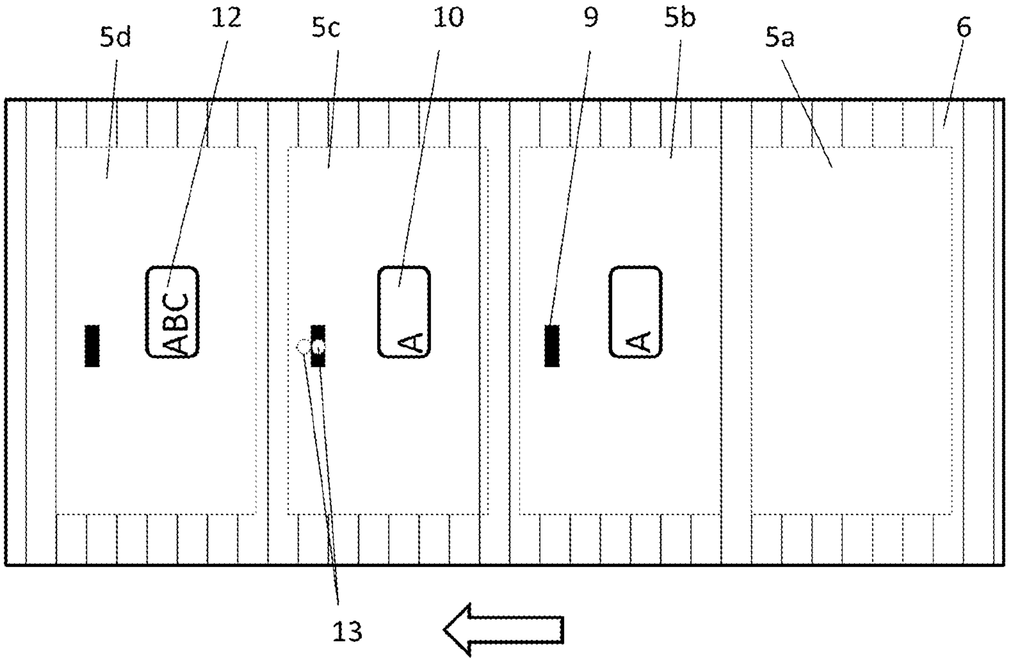
FIG. 2. Top view of the printing process showing four cardboard plates (5) moving in the forward direction along the printing line (6), where the cardboard plate (5*a*) farthest to the right represents a plate that has not been printed, the next cardboard plate (5*b*) represents a plate that has already gone through the flexographic printing process and therefore has the registration mark (9) in the reserve area, centered and in the most advanced part of the cardboard, as well as the image (10) that in this case is represented with the letter "A" that is part of the design that must be printed as final art (12); the next cardboard plate (5*c*) shows the light beams (13) of the sensorics that identifies the area of the registration mark for enabling the start of digital printing, and finally, on the cardboard plate (5*d*) the printing of the flexographic part of the image (10) is finally seen together with the digital printing that generates the impression of the final art (12), which are perfectly synchronized thanks to the adequate recognition of the registration mark (9) and the recognition pattern (not shown).

A description of an embodiment is given below that is not unique or limiting, but merely as an example.

The invention relates to a process and a synchronization device between a flexographic printing and a digital printing to carry out a printing process on cardboard in a hybrid printer, that is, one that combines both flexographic and digital technologies, which uses flexographic printing as a reference, specifically a registration mark, to enable the digital printing that complements the final printing design with a margin of accuracy of up to 0.1 mm The precision in the adjustment is obtained by means of a registration mark that is established in the design of the flexographic plate, which guarantees the ideal location of the reference point on the cardboard plate that the system will have, where the dimensions of said mark are established with a variable width between 5 mm-15 mm and a length range between 0.1 mm and 10 mm, which provides the appropriate size depending on the thickness of the light beam generated by the sensorics that govern digital printing.

The registration mark is located in the cardboard reserve area (with a width of only 5-10 mm around the entire perimeter of the cardboard), in the front position of the cardboard in the forward direction and centered, which will later be discarded, where said mark will be unique and recognizable by the sensor regardless of the lighting, the brightness of the ink and the cardboard, allowing to establish a pattern of recognition of the mark prior to digital printing to enable or not the starting thereof.

At the same time, the system collects data on the speed, frequency, and distance of the cardboard plates from various recognition points along the printing line which detect the passage of the plates in motion towards the sensorics area, where the registration marks previously printed by flexographic printing will be recognized.

The calibration process of the system, prior to each printing process, identifies the new color that will be printed by the flexographic printing process, which allows establishing a recognition pattern for each print, which is defined by the color and contrast that is generated on the cardboard plate and the registration mark previously printed by the flexographic body. The reading of the registration mark is carried out by at least one light contrast sensor that has one or two color recognition light points where, before starting the serial printing, use is made of the sample plates that carry the registration mark so that the system determines the new recognition pattern by means of said contrast sensors.

To establish the appropriate recognition pattern, it is necessary to read the sensorics of the colors that are detected when passing through this area, where the color of the printing line, the color of the cardboard plates, and the color of the registration mark are recognized within a time window.

In this time window, the correct pattern defined by the sequence of colors detected by the sensorics is determined, where the correct pattern, defined in the calibration process, corresponds to the signals that govern the digital printing process.

The time window will have a range between 20 to 100 milliseconds before and after the cardboard plate reaches the point of recognition by the sensor area.

The calibration process comprises:

1. Preparation of the flexographic cliché design with the image(s) to be printed as well as the registration mark.
2. Establishment of system parameters, where:
   a. a program is generated that automatically detects the registration mark by generating the new reference pattern in such a way that:
      i. the first printed sample plate advances along the printing line from flexographic printing to digital printing passing through the sensor area of the system that records the required values of the location and characteristics of the registration mark;
      ii. the operator on the screen validates the setting, accepting the detected color values;
3. Generation of a time window that filters possible detection failures or false alarms generated by the sensor; where:
   a. with the data collected by the system, the frequency with which the cardboard plates arrive at the sensor area is calculated and therefore the registration mark is detected;
   b. with the time window OPEN signals will be recognized as good, allowing a single detection in this window; the rest of the time the window is considered CLOSED and possible false alarms or patterns detected out of time must be ignored.
4. A second printed sample plate is used to confirm the detection of the pattern by establishing and ensuring that the time window is well established.
5. The system is calibrated where each time the sequence "cardboard color-registration mark color" is detected on the cardboard in the sensor area, the specified pattern will be recognized, which will generate a signal for the system to calculate the time for the start of the digital printing process.

The recognition by the system of the location of the registration mark is carried out by means of a series of readings carried out by the sensorics, comprising at least one color sensor with two beams of light located in a line parallel to the direction of advance of the cardboard plates so that, as the cardboard advances along the printing line from flexographic printing, a series of colors or contrasts with illumination will be recognized and captured, associated with the black color of the printing line, the white color of the cardboard plate and the black color of the registration mark, with the following sequence and combinations.

Pattern 1=printing line—printing line: Black-black

Pattern 2=printing line—cardboard: black-white

Pattern 3=cardboard—cardboard: white-white

Pattern 4=cardboard—registration mark: white-black

Pattern 5=registration mark—registration mark: black-black

Pattern 6=registration mark—cardboard: black-white

Each pattern is defined by the reading of the first beam of light or that closest to the digital printer and by the second one that is in line, parallel to the transport movement and therefore farthest from the digital printer.

Where pattern 4 is used as a reference since it indicates that one of the light beams recognizes the cardboard plate and the other light beam recognizes the registration mark.

Once the system is calibrated the printing process will start, where the flexographic printing generates the background color and the registration mark on each cardboard plate, then the cardboard plates advance towards the sensor area on the printing line that adapts the output speed of the flexographic printing plate to the appropriate input speed for the digital printing; after this, the plate passes through the sensor zone so that the registration mark is recognized and the previously established pattern is confirmed so that the system calculates the start time of the digital printing.

The device for carrying out the described process comprises:

a flexographic printing station;

a transition table;

a color sensor;

a transport table;

a digital printing station.

Wherein, in the flexographic printing station, the registration mark is printed on the cardboard plate. This registration mark can be a specific print or the drawing itself to be printed flexographically, or a part thereof.

Following the course of printing, after the flexographic printing station the transition table is arranged that receives the cardboard plates already flexographically printed with the registration mark.

This transition table receives the plates at a speed determined by the output speed of the flexographic printing.

Since the flexographic and digital printers print at different speeds, the transition table must adjust the speed of the plates and deal with the difference between the speed at which the plates exit the flexographic printing station and the speed required for digital printing.

The transition table, in addition to adjusting the speed of the cardboard plates to that required for digital printing, drives such plates towards the sensorics and towards digital printing.

The color sensor, which governs digital printing, is arranged at a point prior to digital printing suitable for color discrimination even in low light conditions.

The color sensor identifies a registration mark on the plate and verifies that the pattern previously established in the calibration is complied with.

If the color sensor verifies that the pattern is complied with, the cardboard plate continues its journey entering the digital printer where the digital print is produced.

The invention claimed is:

1. A METHOD FOR SYNCHRONISING A PRINTING PROCESS ON CARDBOARD to align and synchronise the flexographic printing process and the digital printing process respectively in a hybrid printer characterized in that it comprises a calibration process comprising:

Printing of a registration mark on a first cardboard plate and detection of said mark by the sensor; A first sample plate with a registration mark printed by the flexographic printing where, upon arriving at the printing line, the sensorics detect the colour of the printing line, the colour of the cardboard plate and the colour of the registration mark;

Validation of the settings by accepting the detected colour sequence;

Generation of a time window where these colours will be recognized as good signals allowing a single detection in this window which becomes the recognition pattern; and Introduction into the print line of a second printed sample plate to verify the correct detection of the recognition pattern and that the time window is well established;

wherein the system is synchronised in such a way so that, each time the sequence of colours "cardboard colour-registration mark colour" on the cardboard is detected in the sensor area, it will record the specified recognition pattern and generate a warning signal for the system to perform the calculation of the time in which it will start printing in digital.

2. The METHOD FOR SYNCHRONISING A PRINTING PROCESS ON CARDBOARD according to claim 1, characterised in that the precision in the adjustment between flexographic and digital printing is in the range between 0.1 and 2 pixels.

3. The METHOD FOR SYNCHRONISING A PRINTING PROCESS ON CARDBOARD according to claim 1 characterised in that the registration mark(s) is (are) located on the front part of the cardboard in a reserve area.

4. The METHOD FOR SYNCHRONISING A PRINTING PROCESS ON CARDBOARD according to claim 1 characterised in that the registration mark has a variable width between 5 mm-15 mm and a length between 0.1 mm and 10 mm.

5. The METHOD FOR SYNCHRONISING A PRINTING PROCESS ON CARDBOARD according to claim 1 characterised in that the recognition pattern is defined by the reading made by a first light beam and a second light beam consecutively.

6. The METHOD FOR SYNCHRONISING A PRINTING PROCESS ON CARDBOARD according to claim 1 characterised in that the time window has an opening range from 20 milliseconds to 100 milliseconds before and after the recognition point.

7. The METHOD FOR SYNCHRONISING A PRINTING PROCESS ON CARDBOARD according to claim 1, characterised in that the recognition point occurs when the cardboard plate reaches the sensor area.

8. The METHOD FOR SYNCHRONISING A PRINTING PROCESS ON CARDBOARD according to claim 1 characterized in that in the time window the absence of detection of cardboard plates generates alarm signals that stop the printing process.

9. A DEVICE FOR SYNCHRONISING A PRINTING PROCESS ON CARDBOARD characterized in that it comprises:

A flexographic printing station;

A transition table;

Sensorics;

A transport table; and

A digital printing station;

wherein the flexographic printing station the registration mark is printed that the sensorics will read prior to enabling the digital printing process; and wherein that the colour sensor has two light beams arranged in line parallel to the direction of advancement of the cardboard plates on the printing line.

10. The DEVICE FOR SYNCHRONISING A PRINTING PROCESS ON CARDBOARD according to claim 9, characterised in that the sensorics is arranged at a point prior to digital printing.

11. The DEVICE FOR SYNCHRONISING A PRINTING PROCESS ON CARDBOARD according to claim 9, characterized in that the sensorics comprises at least one colour sensor.

* * * * *